United States Patent
Nakanishi et al.

[11] Patent Number: 5,636,934
[45] Date of Patent: Jun. 10, 1997

[54] STRUCTURAL CONNECTOR, AND METHOD OF MAKING STRUCTURAL JOINT

[75] Inventors: Teruo Nakanishi; Eiji Furuta, both of Kyoto, Japan

[73] Assignee: Kyoto Mokuzou Kenchiku Kenkyuusho, Japan

[21] Appl. No.: 358,623

[22] Filed: Dec. 14, 1994

Related U.S. Application Data

[63] Continuation-in-part of Ser. No. 263,338, Jun. 21, 1994, Pat. No. 5,499,667, and Ser. No. 274,825, Jul. 14, 1994, Pat. No. 5,595,226, and Ser. No. 275,344, Jul. 15, 1994, Pat. No. 5,507,331.

[51] Int. Cl.$^6$ ............................................. F16B 9/00
[52] U.S. Cl. .................... 403/230; 403/231; 403/297; 403/405.1; 411/549
[58] Field of Search ............................. 403/230, 231, 403/297, 405.1, 409.1; 411/349, 549, 550, 551, 553

[56] References Cited

U.S. PATENT DOCUMENTS

| | | | |
|---|---|---|---|
| 313,193 | 3/1885 | Gaylord | 403/231 X |
| 2,403,247 | 7/1946 | Sullivan | 411/551 |
| 2,519,504 | 8/1950 | Robertson | 403/405.1 X |
| 2,994,414 | 8/1961 | Gebhard | 403/231 X |
| 3,313,199 | 4/1967 | Houvener et al. | 403/297 X |
| 5,242,239 | 9/1993 | Hosokawa | 403/258 |

FOREIGN PATENT DOCUMENTS

| | | | |
|---|---|---|---|
| 353731 | 1/1938 | Italy | 411/349 |

*Primary Examiner*—Brian K. Green
*Assistant Examiner*—Andrea Chop
*Attorney, Agent, or Firm*—Klima & Hopkins, P.C.

[57] ABSTRACT

A structural connector for connecting together wooden members. The structural connector is provided with at least one protrusion arm having a hole locking mechanism. Also, a method of making a structural joint.

9 Claims, 8 Drawing Sheets

STRUCTURAL CONNECTOR, AND METHOD OF MAKING STRUCTURAL JOINT

RELATED APPLICATIONS

This application is a continuation-in-part application of U.S. patent application Ser. No. 08/263,338, filed on Jun. 21, 1994, and entitled "DRILLING/CUTTING BIT, AND METHOD OF MAKING STRUCTURAL JOINT", now U.S. Pat. No. 5,499,667 ; U.S. patent application Ser. No. 08/274,825, filed on Jul. 14, 1994, and entitled "DRILLING/ CUTTING MACHINE FOR MAKING JOINTS IN WOODEN MEMBERS", now U.S. Pat. No. 5,595,226; and U.S. patent application Ser. No. 08/275,344, filed on Jul. 15, 1994, and entitled "DRILLING/CUTTING BIT, AND METHOD OF MAKING JOINT", now U.S. Pat. No. 5,507, 331, all fully incorporated by reference herein.

FIELD OF THE INVENTION

The present invention is directed to a structural connector for connecting together wooden members, and method of making the structural joint.

BACKGROUND OF THE INVENTION

Figure 14:
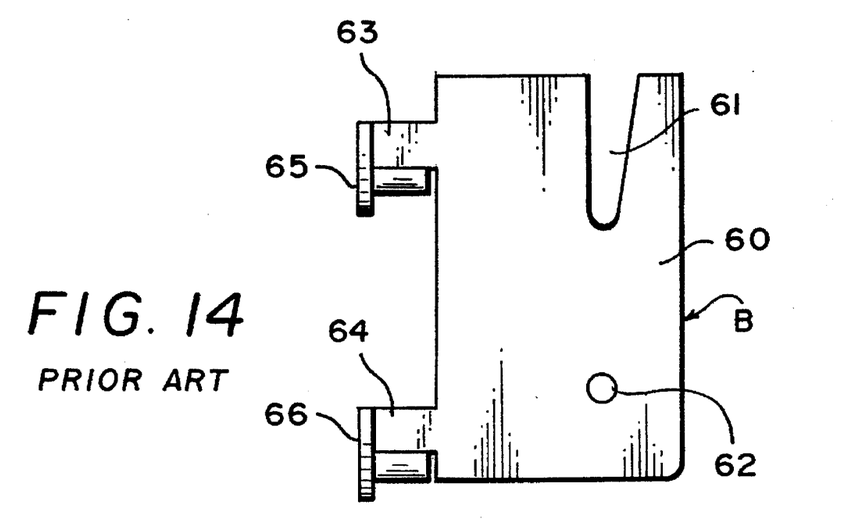
FIG. 14 is a side elevational view of a related prior art structural connector according to the conventional "metal fit" method.
Figure 15:
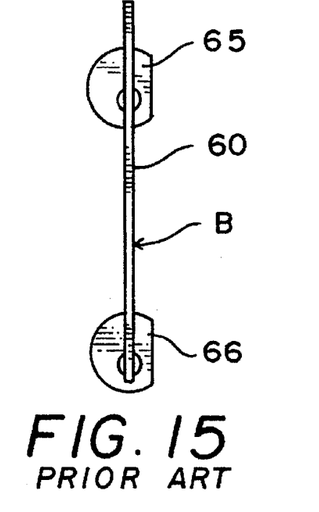
FIG. 15 is an end elevational view of the prior art structural connector shown in FIG. 14.

There are various woodworking methods employed in the construction of buildings with wooden members. One method involves the so called "wing lock method" using various attachment devices to construct wooden frames. An example of said wing lock method is the so called "metal fit method", as shown in FIGS. 14 and 15. An example of a "metal fit" joint is illustrated using a metal plate connector B and a metal fixture (not shown) shaped of semi-circle projection arms (bolts and D-shaped pins can also used) to connect together wooden members.

The "metal fit" joint is used for connecting a horizontal wooden member to a vertical wooden member having a special slot to be discussed below. The metal protrusion arms 63 and 64 are provided with end plates 65 and 66, respectively. The end plates 65 and 66 can be attached, for example, by welding. The metal plate 60 is provided with a hole 62 and a U-shaped slot 61 for connecting the metal plate to the horizontal wooden member using bolts.

The method of forming the joint using the metal plate connector B illustrated in FIGS. 16 through 20.

The holes 81, 82 are drilled into the vertical member or column 80. The metal protrusions arms 63 and 64 having welded metal end plates 65 and 66 of the metal plate connector B are inserted into the previously drilled holes 81 and 82 in the column 80, as shown in FIG. 16.

Figure 17:
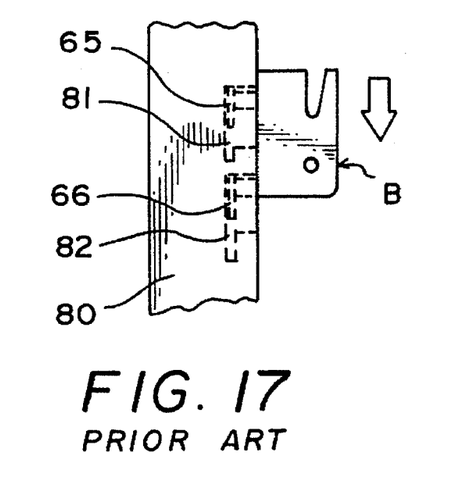
FIG. 17 is a side view illustrating the method continued from FIG. 16.

Once the metal end plates 65 and 66 are fully fitted into the drilled holes 81 and 82, the metal plate connector B is hit downwardly with and appropriate tool to set the metal plate connector B firmly in the column 80, as shown in FIG. 17.

Figures 16, 18:
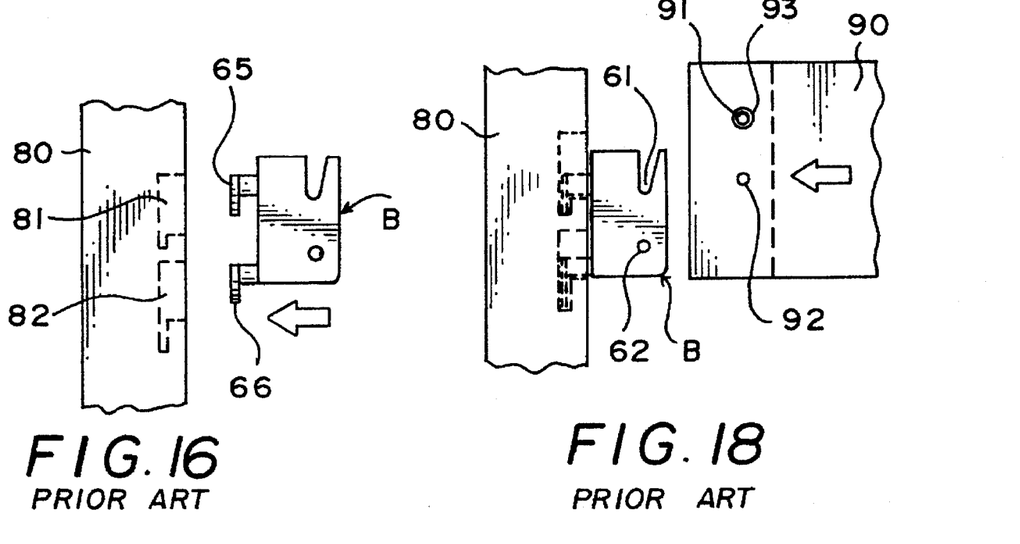
FIG. 16 is a side elevational view illustrating a method of making joints by using the attachment plate shown in FIG. 14 on the wooden member.
FIG. 18 is a side view illustrating method continued from FIG. 17.

As shown in FIG. 18, a pin 93 having a D-shaped pin cross section is inserted into the previously drilled hole 91 in the beam 90. The beam 90 also has a slit provided at its end (not shown). The beam 90 is then moved in the direction of the arrow all the way so that the end grain of the beam 90 meets the column 80 completely.

Figure 19:
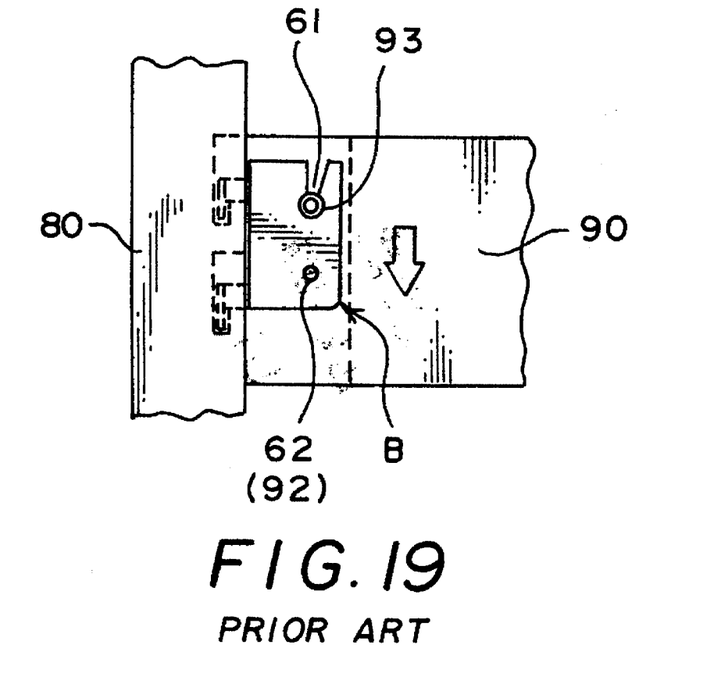
FIG. 19 is a side view illustrating method continued from FIG. 18.
Figure 20:
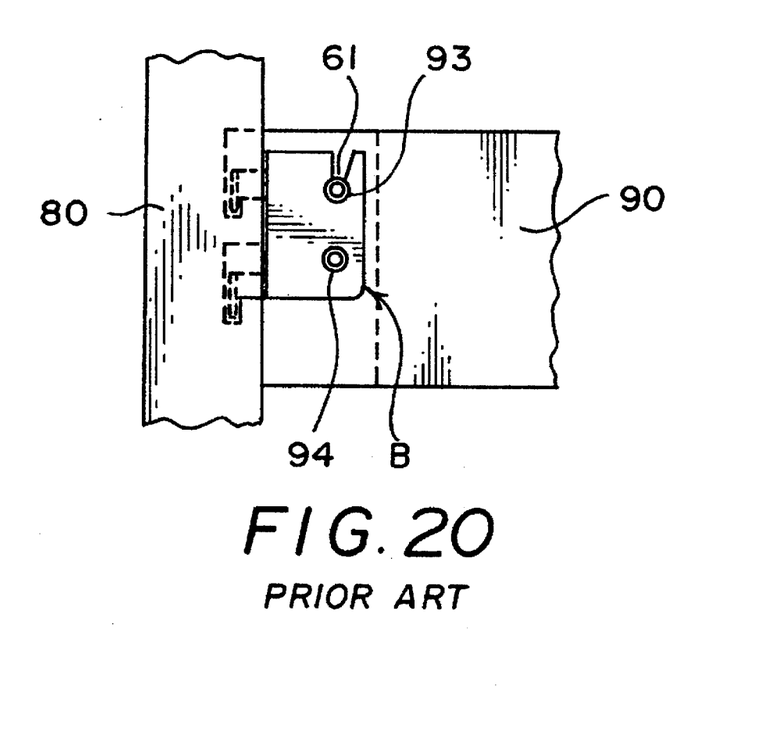
FIG. 20 is a side view illustrating method continued from FIG. 19.

The beam 90 is then pushed down from its upper side until the pin 93 registers with the bottom of U-shaped slot 61, as shown in FIG. 19. The beam 90 is further forced downwardly with appropriate pressure, and the pin 94 is inserted through the hole 92 in the beam 90, and through hole 62 of the plate B. Nuts are threaded onto and tightened onto the pins 93 and 94, as shown in FIG. 20.

In order to use the metal plate connector B, it is necessary to provide the holes 81 and 82 in the column 80. The holes 81 and 82 are made by such cutting tools as drill bits and rotary bits, however, it is quite possible that the size of the holes may not be accurate depending on the method of drilling such holes. Especially in the situation where the size of the holes are somewhat larger than the size of the metal end plates 65 and 66 of the metal plate connector B, when the metal protrusions arms are inserted into the holes and forced downwardly the joints may not become stable due to space between the holes and the metal end plates 65 and 66. Thus, the metal plate connector B is no longer securely fastened to the column 80, and can easily become loose.

Furthermore, with the metal plate connecters B as explained above, the metal protrusions arms are inserted into the holes and then forced downwardly with an appropriate tool. Thus, the method takes a significant amount of time, and is troublesome due to the requirement of forming holes with the exact size and steps associated with placing the metal connector B into the column 80.

SUMMARY OF THE INVENTION

Thus, an object of the present invention is to provide an structural joint and method of making to provide ease and accuracy in the assembly of wooden structures made of wooden members.

Another object of the present invention is to provide a structural joint for connecting together wooden members comprising a base plate and at least one expandable projecting arm.

According to the present invention, the holes in the wooden members to receive the protrusion arms should be of sufficient size to accommodate the dimensions of the protrusions arms when not expanded. However, unlike using the conventional method and structural joint (FIGS. 14 and 15), in the present invention an additional hole is provided approximately midpoint into the hole in the wooden member for accommodating the gripping elements of the expandable protrusion arm. The additional hole has a larger diameter than the main hole drilled into the wooden member.

In order to insert the structural connector into the hole in the wooden member, the protrusion arm is placed in a non-expanded configuration with the gripping element retreated. In this configuration, the expandable protrusion arm has a diameter the same or less than the diameter of the hole in the wooden member, and the protrusion arm can be easily slide into the hole. After inserting the protrusion arm all the way into the hole, the protrusion arm is expanded relative to the internal diameter of the hole with an appropriate tool (e.g. screw driver), and the expanding gripping elements move into the additional hole formed at midpoint in the main hole. The expanding gripping elements are moved outwardly all the way until the edges thereof are stopped by the inner surface walls of the additional hole.

As explained above, this attachment device is secured in place by moving the expanding gripping elements outwardly after insertion of the protrusion arm. Thus, even if there exists some added space between the surface of the protrusion and the surface wall of the hole due to some error in size of the hole, by moving the gripping elements outwardly all the way until the edge of the gripping elements are stopped by the walls of the additional hole, the gripping elements are firmly fitted into the additional hole and the structural connector is no longer loose.

Also, to fasten the structural connector to the wooden member, all that is required is to insert the protrusion into the hole and expand the gripping elements outwardly. There is no need to force downwardly, nor using the tools required in the conventional method. Thus, the steps to make such joints require less amount of time, and are easier to assemble than that of the conventional method. Moreover, since a little error in size of the hole or the existence of space between the body of the protrusion are no longer a significant problem, there is no need to take extraordinary attention on the accuracy of the size of the hole. Thus, drilling the hole for the structural connector takes less amount of time, and is easier than that of the conventional method.

Furthermore, the materials to be used for the present invention of the structural connector need not be metal as long as it has enough strength. It can be made of metal, resin, or synthetic resin.

BRIEF DESCRIPTION OF THE DRAWINGS

The invention will now be described by way of example with reference to the accompanying drawings.

DETAILED DESCRIPTION OF PREFERRED EMBODIMENTS

Figure 1:
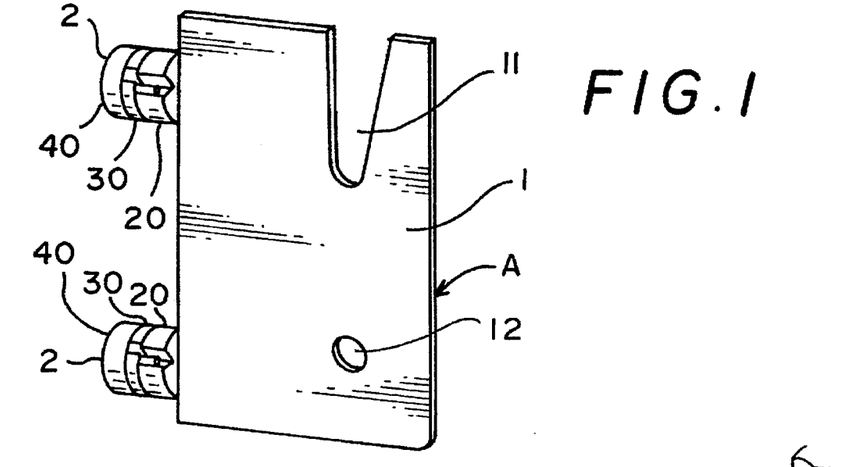
FIG. 1 is a perspective view of a structural connector according to the present invention.

The invention will now be described by way of example. A preferred embodiment of the structural connector according to the present invention is shown in FIG. 1. The structural connector A is designed to be used in the "metal fit" method.

The structural connector A comprises a rectangular shaped base plate 1 and two (2) protrusion arms 2 extending from the side of the plate 1.

As is shown in FIG. 1, the base plate 1 is practically the same as the conventional metal plate 60 of the metal plate connector B (FIG. 14), and is provided with a U-shaped slot 11 and a hole 12.

The protrusion arm 2 comprises a cylinder shaped base portion 20 attached to the side of the base plate 1 such as by welding, a cylinder shaped end portion 40 connected to said base portion 20 with space provided therebetween, and an expanding plate portion 30 positioned between the base portion 20 and the end portion 40.

The expanding plate portion 30 can be expanded so that at least a portion of the expanding plate portion 30 can be extended beyond the outer diameter of the end portion 40.

Figure 2A:
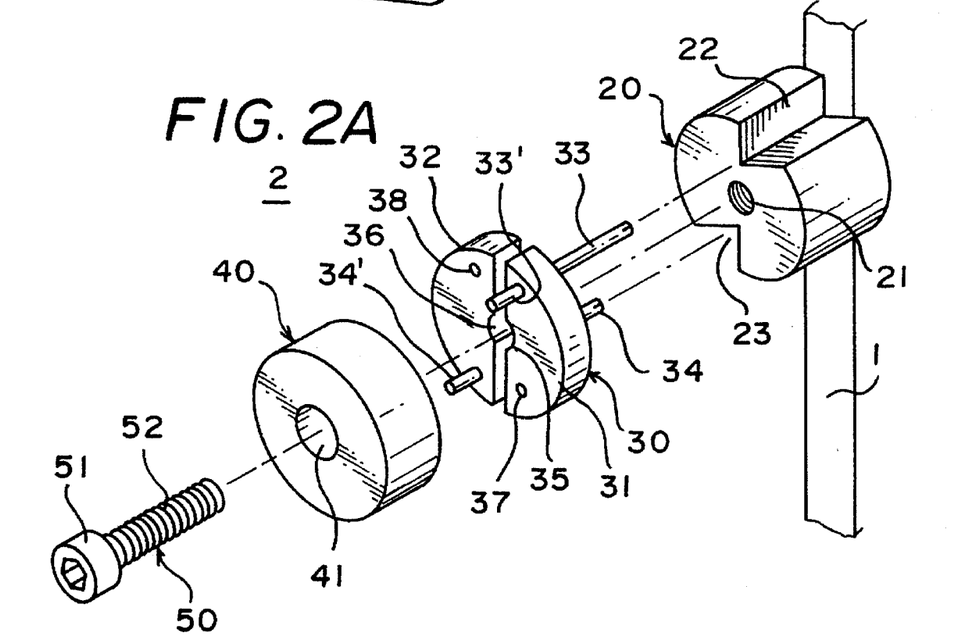
FIG. 2A is an enlarged exploded perspective view of a protrusion arm of the structural connector shown in FIG. 1.

The center of the base portion 20 is provided with an internally threaded hole 21, and the center of the end portion 40 is provided with a hole 41a (FIG. 3) and recess 41 (FIG. 2A). A bolt 50 extends through the hole in the end portion 40 for connecting the end portion 40 to the base portion 20. The depth of the recess 41 is as deep as the head 51 of the bolt 50 so that the head 51 will not extend beyond the surface of the end portion 40. The length of the bolt 50 is sufficient so that the threaded part 52 extends to the threaded hole 21 of the base portion 20. The bolt 50 also extends through the expanding plate portion 30, which is located between the end portion 40 and base portion 20.

The expanding plate portion 30, in this embodiment, is defined by a split plate portion having two (2) gripping elements 31, 32 (e.g. half-circular shaped elements). The protruding pins 33, 34 are provided on the gripping elements 31, 32, and extend towards the base portion 20. A set of passageways 22, 23 (e.g. slots) are provided on the base portion 20 to accommodate the respective protruding pins 33, 34. The length of the protruding pins 33, 34 from the surface of the gripping elements 31, 32 to there ends are less than the length of the base portion 20.

Figure 2B:
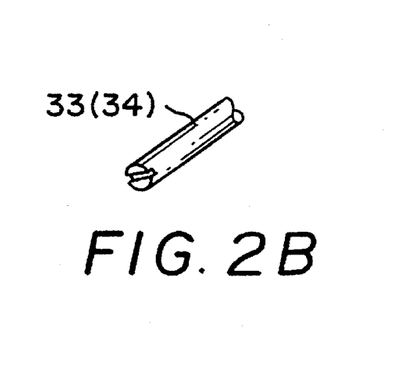
FIG. 2B is an exploded detailed end view of the protruding pins showing a slot for receiving the tip of a conventional screwdriver.

The ends of the protruding pins 33, 34 are provided with means for connection with a tool for turning the protruding pins 33, 34. For example, slots (FIG. 2B) can be provided in the ends of the protruding pins 33, 34 for receiving the tip of a conventional screw driver. The protruding pins 33, 34 are connected to the gripping elements 31, 32, respectively, and are fixed from relative rotation therewith so that when the protruding pins 33, 34 are rotated, the gripping elements 31, 32 are also rotated.

Figure 3:
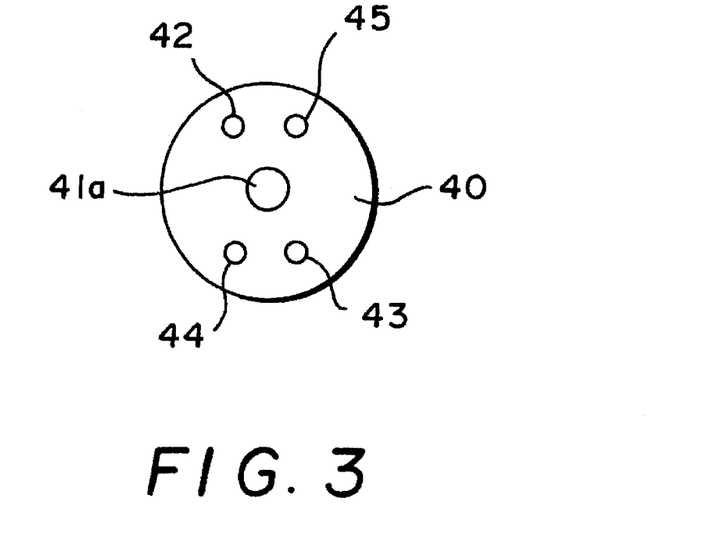
FIG. 3 is a surface view of an end portion of the protrusion arm shown in FIG. 2A.

The protruding pins 33, 34 extend through the gripping elements 31, 32, respectively, with protruding pin end portions 33', 34' extending towards the end portion 40. The protruding pin end portions 33', 34' are received within holes 42 and 43 of the end portion 40, as shown in FIG. 3. Thus, the gripping elements 31, 32 can be turned by the protruding pins 33, 34 acting as pivots.

A through hole is provided in the expanding plate portion 30, as shown in FIG. 2A. More specifically, the gripping elements 31, 32 are provided with semi-circular slot 35, 36 to receive the threaded part 52 of the bolt 50.

Figure 2C:
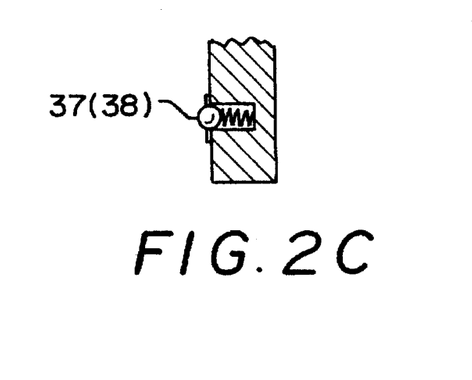
FIG. 2C is a diagrammatical cross-sectional view of a ball plunger used in the structural connector according to the present invention.

The gripping elements 31, 32 are provided with releasable locking devices such as ball plunger 37, 38 (FIG. 2C) for releasably locking the gripping elements in either a non-expanded position or an expanded position. Specifically, the ball plungers 37, 38 are set off and positioned a distance away from the pivotal axes of the protruding pins 33, 34. Further, the inner end face of the end portion 40 is provided with holes 44, 45, as shown in FIG. 3, for cooperating with the ball plungers 37, 38. When the gripping elements are positioned in their non-expanded positions, the balls of the ball plungers 37, 38 partially extend into the holes 44, 45 on the inner face of the end portion 40 releasably locking the gripping elements in there closed position. When the protruding pins 33, 34 are rotated by a screwdriver, the balls of the ball plungers 37, 38 are forced out of the holes 44, 45 and ride on the inner face surface of the end portion 40 until the gripping elements 31, 32 are fully expanded into their open position whereby the balls of the ball plungers ride over the outer peripheral edge of the end portion 40 again releasably locking the gripping elements 31, 32 in the open position.

Figure 4:
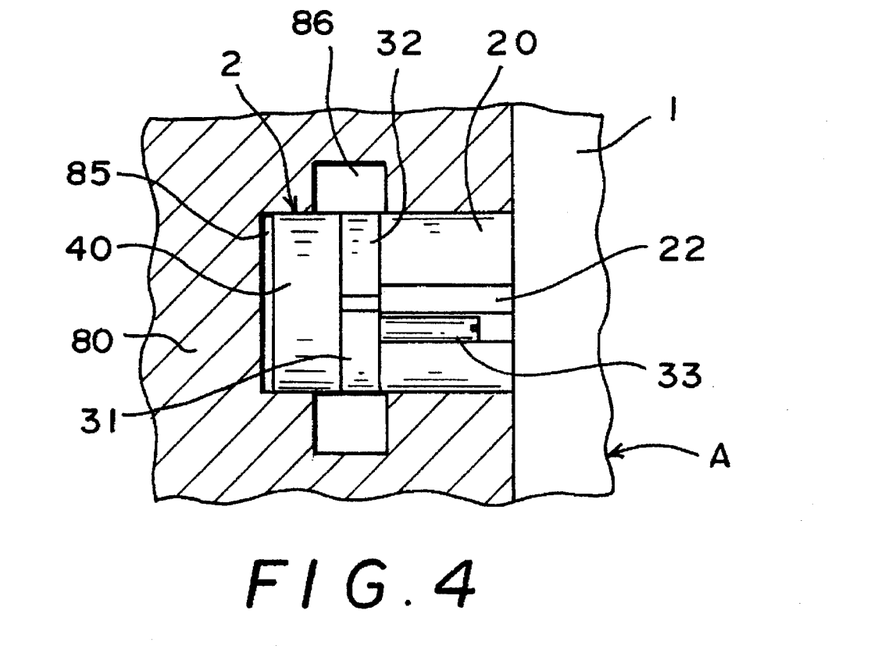
FIG. 4 is the first side view illustrating a method of fixing the protrusion arm of the structural connector shown in FIG. 1 on the wooden member.

The method of firmly fixing the protrusion arm 2 of the attachment device A to wooden members is shown in FIG. 4. In order to make joints as shown in FIG. 14, the following steps are performed:

1) the cylinder-shaped hole 85 is drilled into the proper place on the wooden member (e.g. column 80) to be inserted with the protrusion arm 2 connected to the side of the plate 1.

2) approximately at about midpoint in the depth of the hole 85 where the distance from the surface of the wooden member is a little less than the length of the base portion 20, an additional hole 86 is drilled with a diameter larger than that of the hole 85 to receive the gripping elements 31, 32 of the expanding split plate. The hole 85 and the additional hole 86 have a common center with the cylinder.

3) the protrusion arm 2 is inserted into the hole 85 all the way to the connecting part of the base portion 20 (FIG. 4). At this point, the gripping elements 31, 32 are not yet protruding outwardly, thus, it is easy to insert the protrusion arm 2 into the hole 85.

Figure 5:
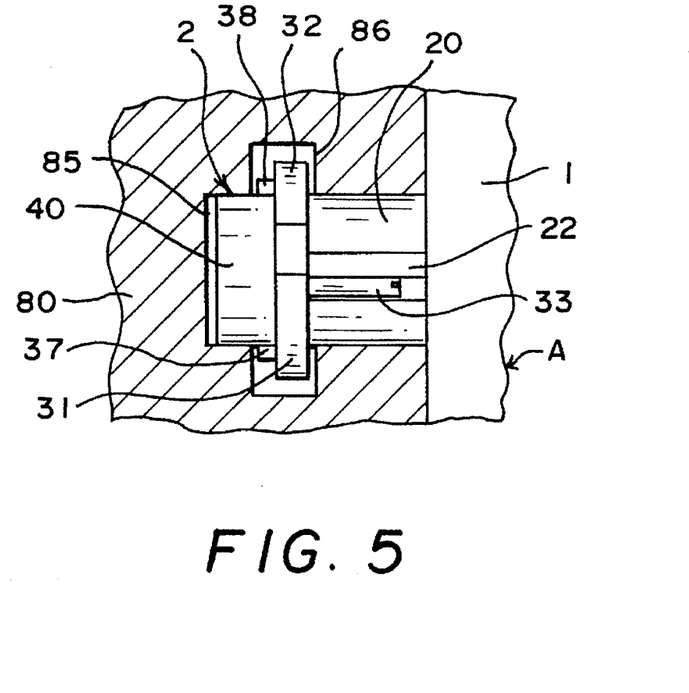
FIG. 5 is the second side view illustrating a method of fixing the protrusion arm of the structural connector shown in FIG. 1 on the wooden member.

4) the protruding pins 33, 34 are turned by an appropriate tool such as a screwdriver, and thus the gripping elements are rotated and protrude all the way until stopped by the surface wall the additional hole 86, as shown in FIG. 5. At this point, the ball plungers 37, 38 are forced out of the holes 44, 45 in the inner face of the end portion 40. The balls of the ball plungers 37, 38 ride on the inner surface of the end portion 40 as the gripping elements 31, 32 are turned further outwardly until the balls of the ball plungers spring out when they extends over the outer peripheral edge of the end portion 40.

5) the above steps result in the gripping elements 31, 32 entering into the additional hole 86, and are extended all the way out to a fully opened position when the gripping elements are stopped by the inner surface walls of the additional hole 86. Thus, the gripping elements 31, 32 and accordingly the protrusion arm 2 will not come out from the hole 85. Further, since the balls of the ball plungers are fully sprung outwardly, the gripping elements 31, 32 cannot freely be turned to their closed position, and the fully opened expanded position of the gripping elements 31 and 32 is maintained.

6) even if there existed some error in the size of the additional hole 86 which is drilled a little larger, it is possible to hold the gripping elements 31, 32 in the additional hole 86 by turning the protruding pins 33, 34 to move further outwardly. Thus, the structural connector A is firmly fixed on the column 80, and will not be loose. The method of forming a structural joint for connecting a horizontal wooden member (e.g. a beam) to the base plate 1 of the structural connector A, can be performed as the conventional method shown in FIG. 18 to 20.

Another example of the structural connector $A_1$, and the method of forming the structural joint by connecting the beam and the column using the structural connector $A_1$ is shown in FIGS. 6 to 9.

Figure 6:
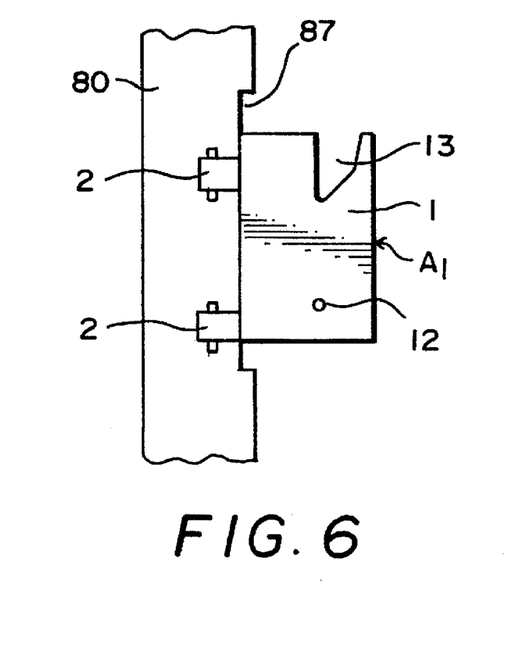
FIG. 6 is a side view illustrating another embodiment of a structural connector according to the present invention.

The structural connector $A_1$ is formed almost the same as the structural connector A, except one side of the slot 13 of the base plate 1 is modified, as shown in FIG. 6.

The following method steps are performed in this example:

1) to attach the structural connector $A_1$ on the column 80, a moderately deep transverse groove 87 is made in the column 80. The size of the groove 87, from upper edge to bottom edge, is somewhat larger than the size of the end grain of the beam 100 to be attached to the device $A_1$, from upper edge to bottom edge.

2) similar to the embodiment shown in FIGS. 4 and 5, a hole 85 and additional hole 86 are drilled in the groove 87 to receive the protrusion arm 2 and gripping elements 31, 32, respectively. The structural connector $A_1$ is firmly fixed on the column 80 by inserting the protrusion arm 2 in the hole and additional hole.

3) at the end grain of the beam 100, slot 101 is made to receive the base plate 1 of the structural connector $A_1$, and the holes 102, 103 associated with the slot 13 and the hole 12 of the base plate 1 are previously made. A D-shaped pin is placed through hole 102.

Figure 7:
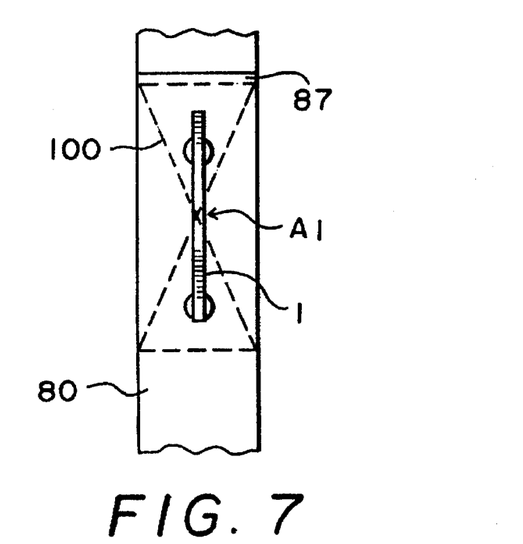
FIG. 7 is a front view of the structural connector shown in FIG. 6.
Figure 8:
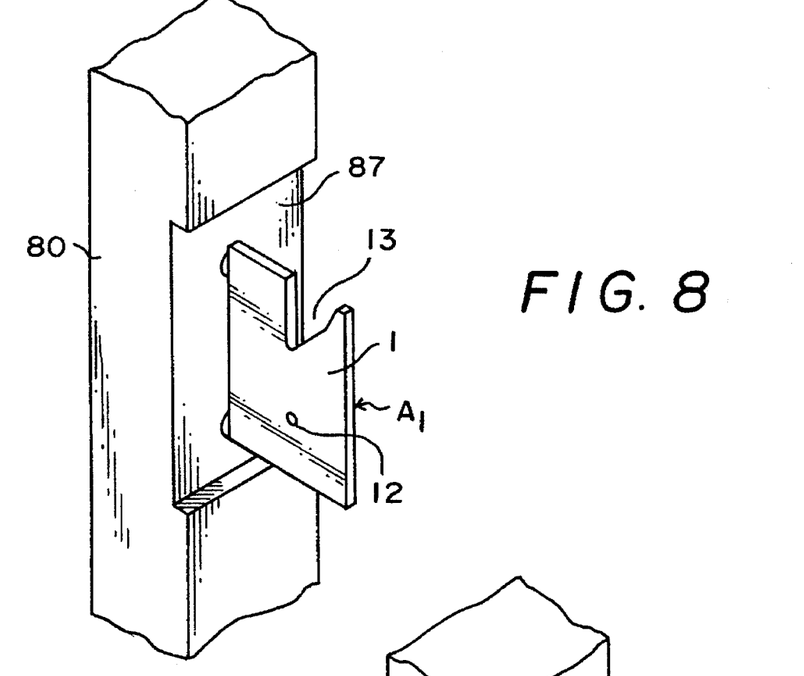
FIG. 8 is a perspective view of the structural connector shown in FIG. 6.
Figure 9:
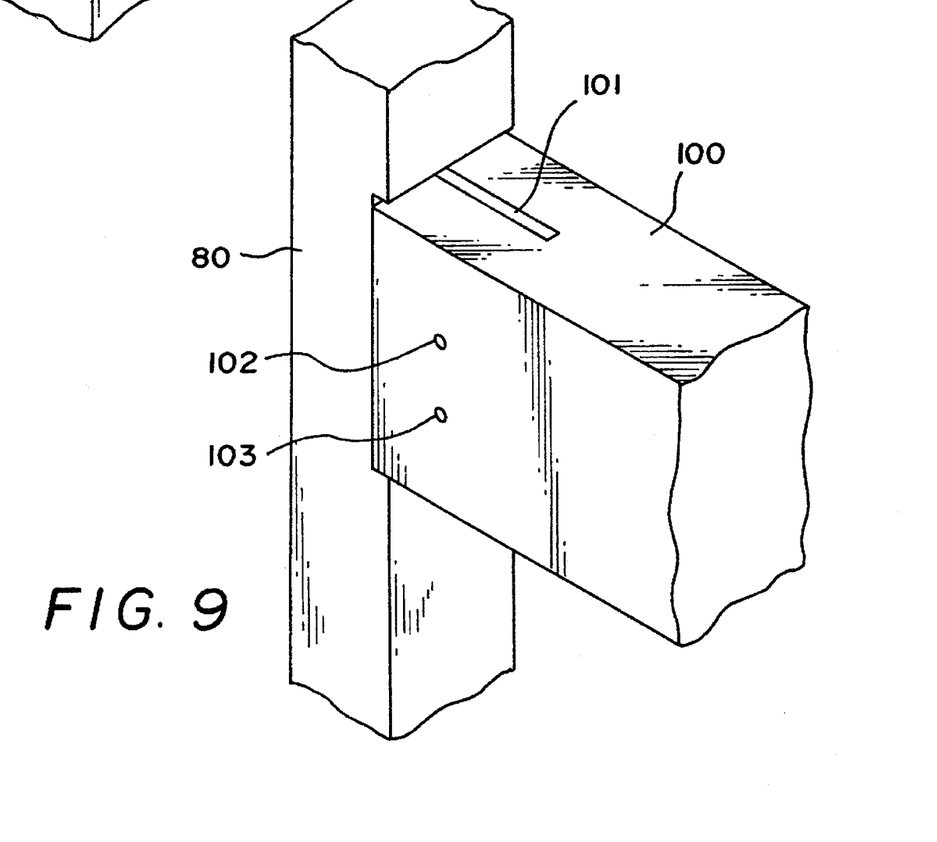
FIG. 9 is a perspective view of the structural joint made with the connector shown in FIG. 6.
Figures 10, 11, 12:
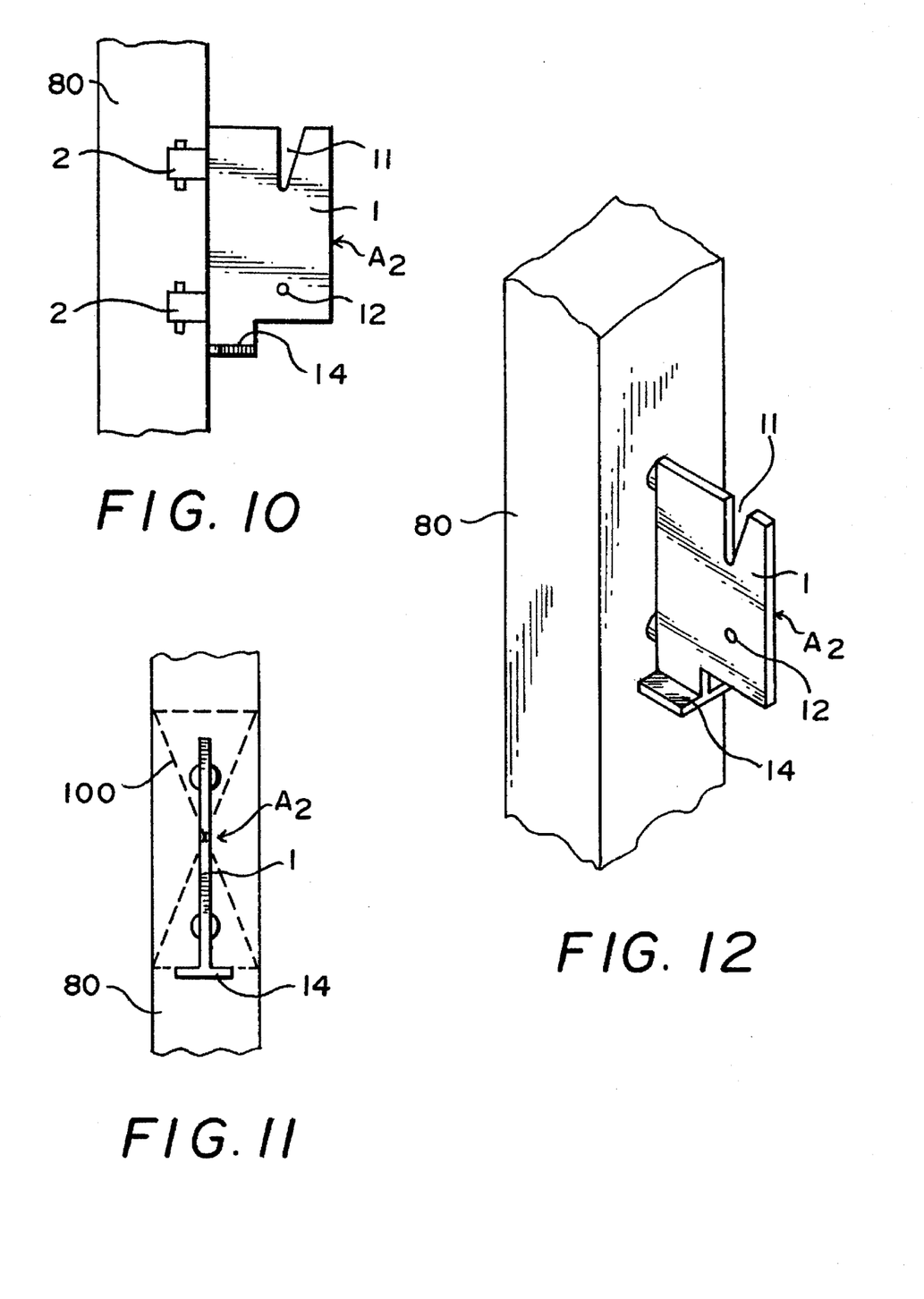
FIG. 10 is a side elevational view of a further embodiment of the structural connector according to the present invention.
FIG. 11 is a front view of the structural connector shown in FIG. 10.
FIG. 12 is a perspective view of the structural connector shown in FIG. 10.
Figure 13:
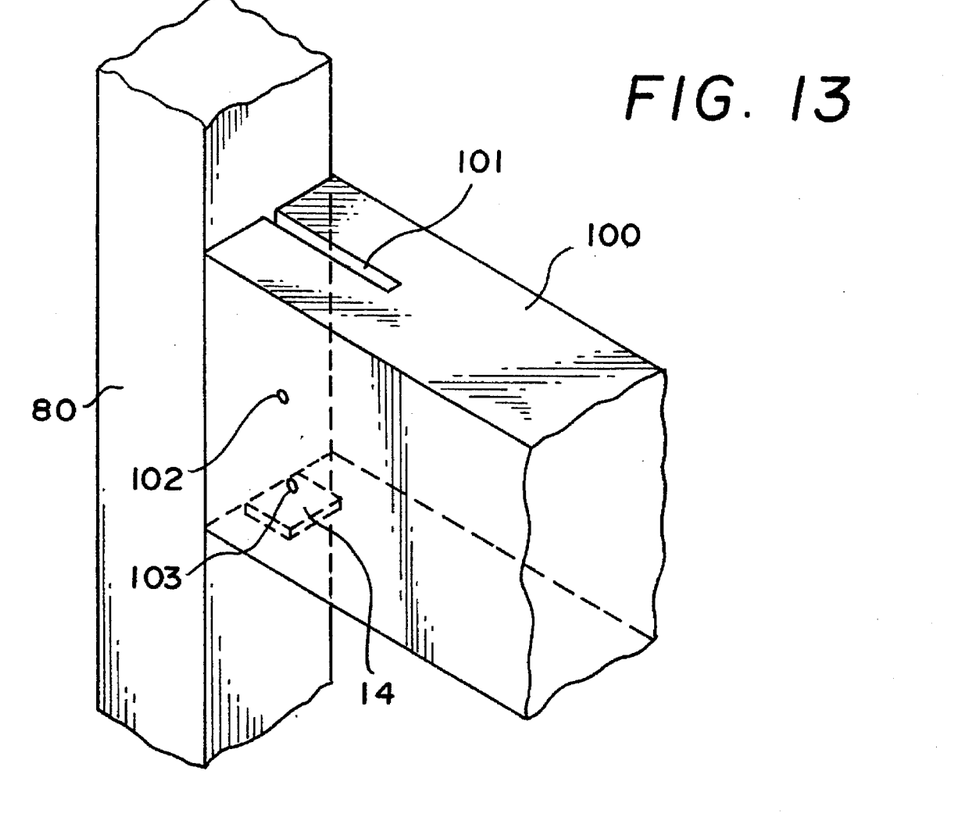
FIG. 13 is a perspective view of the structural joint made with the structural connector shown in FIG. 10.

4) by forcing the beam 100 downwardly from the upper side of the base plate 1 by putting the base plate 1 in the slot 101, the beam 100 moves downwardly along the slot 13 of the plate 1. As the beam 100 moves completely to the appropriate place of the plate 1, the end grain of the beam 100 then meets the surface of the groove 87 of the column 80. The beam 100 is now fitted into the groove 87. However, at this point, there is still a little space between the upper surface of the beam 100 and the upper edge of the groove 87. (FIG. 7 and 9).

5) after deciding the position of the beam 100, the D-pin is inserted into the hole 103 as in the conventional method.

According to this example, the beam 100 can be more firmly fixed on the column 80, since the beam 100 is secured on the column 80 after the end grain of the beam 100 is fitted into the groove 87 of the column 80.

Another example of the structural connector $A_2$, and method of forming the joint and connecting the beam and the column using the structural connector $A_2$, is shown in FIGS. 10 to 13. The structural connector $A_2$ according to the attachment device A of FIG. 1 having a support plate 14 shaped like an up-side down T which protrudes from the side of the protrusion arm 2 of the bottom of the base plate 1 perpendicularly to the surface of the plate 1. In this case, as in the conventional method of using the attachment device A, when the beam 100 is installed on the previously secured base plate 1 of the attachment device A$_2$, the lower surface of the beam 100 is then held by the support plate 14. Thus, the beam 100 is then held by the support plate 14, and the beam 100 is supported by the support plate 14 from lower surface. By forming the support plate 14, the beam 100 can be more firmly fixed on the column 80 just as the groove 87 made on the column 80.

The above example is used in the "metal fit" method, however, it can be used for methods other than the "metal fit" method such as the "Winglock" method.

The present invention of the structural connector and method of making structural joints according to the present invention comprises a plate and a protruding arm including a base portion, an expanding plate portion and an end portion.

Thus, after inserting the protruding arm into the hole on the wooden member and expanding the expanding plate portion, gripping elements of the expanding plate portion will be inserted into the additional hole and the protruding arm will be kept in the hole. Thus, even if there is some error in the size of the additional hole, by adjusting the degree of expansion of the expanding plate portion, the structural connector is firmly fixed on the wooden member, and is no longer loose.

Moreover, to fasten the structural connector to the wooden member, all that is required is for the protruding arm to being inserted into the hole and then expand the expanding plate portion. Thus, the steps and amount of time to make such a joint are decreased, and the assembly is easier.

Furthermore, since any error in size of the hole is correctable by the structural connector, there is no need to take extraordinary attention to detail on the accuracy of the size of the hole. Thus, drilling the holes for the structural connector is easier.

Also, by providing a wooden member supporting plate protruding from the bottom of the base plate and perpendicular thereto, the beam and column for example can be more securely connected.

The structural connector according to the present invention, and method of making a structural joint have been explained above with reference to connecting wooden members together. However, such structural connectors and method of making structural joints can be applied to connecting other types of members together such a members made of plastic, steel, concrete, other composites, and other suitable materials.

We claim:

1. A structural joint for connecting together structural members, said joint comprising:

a flat base plate configured for connecting to one end of one of the structural members; and a cylindrical-shaped protrusion arm connected to and extending from an edge of said base plate for connecting into a hole in the other structural member, said protrusion arm having a cylindrical-shaped expanding portion for locking said protrusion arm into the hole in the other structural member, said protrusion arm including a cylindrical-shaped base portion connected to said base plate and a cylindrical-shaped end portion connected to an end of said cylindrical-shaped base portion, said cylindrical-shaped expanding portion of said protrusion arm being defined by a cylindrical-shaped expanding plate portion disposed between said cylindrical-shaped base portion and said cylindrical-shaped end portion, and said cylindrical-shaped expanding plate portion being defined by a split plate having a pair of rotatable gripping elements and a through hole, said rotatable gripping elements can be rotated to an open position of greater outer dimension than outer dimensions of said cylindrical-shaped base portion.

2. A structural joint according to claim 1, wherein said expanding plate potion includes a bolt connecting said cylindrical-shaped end portion to said cylindrical-shaped base portion, and passing through said through hole of said split plate.

3. A structural joint according to claim 2, wherein each gripping element is provided with a pin extending through both sides thereof, said base portion is provided with a passageway to accommodate one side of said pins, and said end portion provided with a set of holes for accommodating opposite ends of said pins in a manner so that said gripping elements are rotatable along axes of said pins.

4. A structural joint according to claim 3, wherein said passageway is defined by a longitudinal groove in the surface of said base portion.

5. A structural joint according to claim 3, wherein each said gripping element is provided with a ball plunger offset from said rotational pin axes, and said end portion is provided with a set of holes for cooperating with said ball plungers of said gripping elements to provide releasable stops for maintaining said gripping elements in a closed position when inserting said protrusion arm, and allowing said gripping elements to be expanded and provide stops against an outer edge of said end portion.

6. A structural joint according to claim 1, further including a lower support plate connected to a bottom of said base plate.

7. A structural joint according to claim 6, wherein said lower support plate is positioned perpendicular relative to a lower portion of said base plate.

8. A structural joint for connecting together structural members, said joint comprising:

a flat base plate configured for connecting to one end of one of the structural members;

a lower support plate connected to a bottom of said base plate; and a cylindrical-shaped protrusion arm connected to and extending from an edge of said base plate for connecting into a hole in the other structural member, said protrusion arm having a cylindrical-shaped expanding portion for locking said protrusion arm into the hole in the other structural member.

9. A structural joint according to claim 8, wherein said lower support plate is positioned perpendicular relative to a lower portion of said base plate.

* * * * *